United States Patent
Thoma et al.

(10) Patent No.: US 8,372,177 B1
(45) Date of Patent: Feb. 12, 2013

(54) METHOD OF SYNTHESIZING TUNGSTEN NANOPARTICLES

(75) Inventors: Steven G. Thoma, Albuquerque, NM (US); Travis M. Anderson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 274 days.

(21) Appl. No.: 12/774,212

(22) Filed: May 5, 2010

(51) Int. Cl.
 *B22F 9/24* (2006.01)
 *B22F 9/28* (2006.01)
(52) U.S. Cl. .............. 75/362; 75/371; 977/896
(58) Field of Classification Search .......... None
 See application file for complete search history.

(56) References Cited

U.S. PATENT DOCUMENTS

| | | | | |
|---|---|---|---|---|
| 2,935,394 | A * | 5/1960 | Hiler | 75/255 |
| 6,645,444 | B2 * | 11/2003 | Goldstein | 423/1 |
| 2007/0059544 | A1 * | 3/2007 | Xiong et al. | 428/506 |
| 2010/0075137 | A1 * | 3/2010 | Sinton et al. | 428/328 |
| 2010/0175984 | A1 * | 7/2010 | Butts et al. | 204/157.42 |

FOREIGN PATENT DOCUMENTS

WO  WO 2007/030254 A2  3/2007

* cited by examiner

*Primary Examiner* — George Wyszomierski
(74) *Attorney, Agent, or Firm* — Olivia J. Tsai

(57) ABSTRACT

A method to synthesize tungsten nanoparticles has been developed that enables synthesis of nanometer-scale, monodisperse particles that can be stabilized only by tetrahydrofuran. The method can be used at room temperature, is scalable, and the product concentrated by standard means. Since no additives or stabilizing surfactants are required, this method is particularly well suited for producing tungsten nanoparticles for dispersion in polymers. If complete dispersion is achieved due to the size of the nanoparticles, then the optical properties of the polymer can be largely maintained.

20 Claims, 2 Drawing Sheets

METHOD OF SYNTHESIZING TUNGSTEN NANOPARTICLES

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention relates to method for synthesizing a suspension of monodisperse tungsten nanoparticles. There are many existent metal nanoparticle syntheses. See: [1] Landstrom et al, "Characterization and modeling of tungsten nanoparticles generated by laser-assisted chemical vapor deposition: Journal of Applied Physics 95 (2004) 4408-4414; [2] Lei et al, "Synthesis of tungsten nanoparticles by sonoelectrochemistry", Ultrasonic Sonochemistry 14 (2007) 81-83; [3] Xiong et al, "Synthesis and characterization of ultrafine tungsten and tungsten oxide nanoparticles by a reverse microemulsion-mediated method", Chem. Mater. 18 (2006) 2211-2218; [4] Magnusson et al, "Single-crystal tungsten nanoparticles produced by thermal decomposition of tungsten hexacarbonyl", J. Mater. Res. 15 (2000) 1564-1569; [5] Prasanta et at "Synthesis of tungsten nanoparticles by solvothermal decomposition of tungsten hexacarbonyl", International Journal of Refractory Metals and Hard Materials 27 (2009) 784-791; and [6] (WO/20071030254) Methods of Producing Tungsten Nanoparticles. All of these, however, are either energy-intensive; are difficult to scale up; cannot produce monodisperse particles; and require the use of surfactants or other stabilizing ligands (which decrease the utility of the synthesized product). For instance, in order to get high loadings, such as 50 weight percent metal nanoparticles into an optically clear polymer without loss of optical properties, the nanoparticles must be sufficiently small and complete nanoparticle dispersion is required. In order to avoid the detrimental agglomeration, the polymer must chemically interact favorably with the metal nanoparticles. If the metal nanoparticle has a surface layer of surfactant, or other stabilizing ligand, then such a favorable interaction is difficult or impossible to achieve.

Tetrahydrofuran (THF) is chemically compatible with many systems, and is easily removed due to its relatively low boiling point. The ability to synthesize metal nanoparticles that are stabilized by only THF could enable production of high loading nanoparticle-polymer composites without sacrificing the original (desired) polymer properties.

SUMMARY OF THE INVENTION

We have developed an improved synthesis technique to produce suspended tungsten nanoparticles stabilized by coordinating solvents, that doesn't require the use of surfactants or other stabilizing ligands. The metal atom in tungsten carbonyls is already in the zero oxidation state (fully reduced) and is therefore capable of forming bulk metal-metal chemical bonds if the carbonyl groups were removed. Carbonyl groups are removed by use of a reducing agent that acts on the carbonyl group, rather than the metal; thereby releasing it. Removal of the carbonyl groups in a coordinating solvent can yield highly monodisperse, nanometer size metal particles stabilized only by the coordinating solvent. Coordinating solvents that contain oxygen as ether groups, such as tetrahydrofuran, are particularly suited to stabilize carbonyl forming metals. These syntheses can be performed at room temperature, which is a distinct advantage over metal carbonyl thermal decomposition synthetic methods. The improved synthesis method can also be applied to tungsten halide salts of varied oxidation states, provided sufficient reducing agent is added to fully reduce the metal to its zero valence state.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Figure 1:
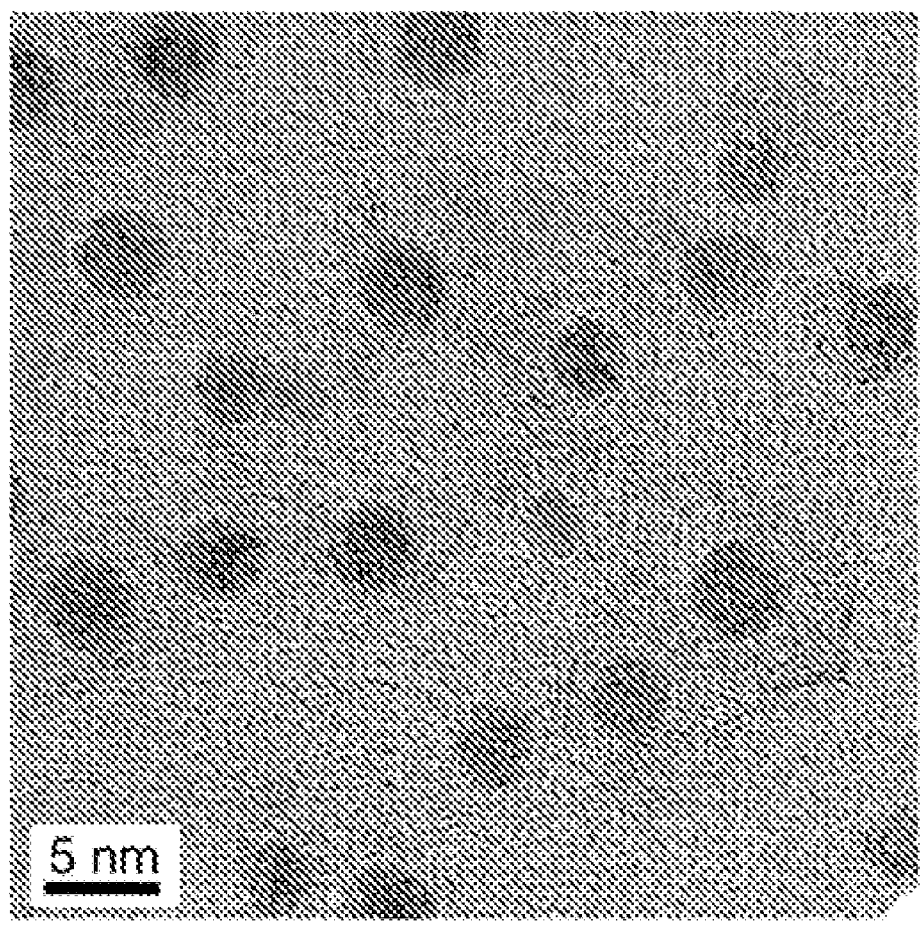
FIG. 1 TEM micrograph of suspended tungsten nanoparticles made using the method of Example 1.
Figure 2:
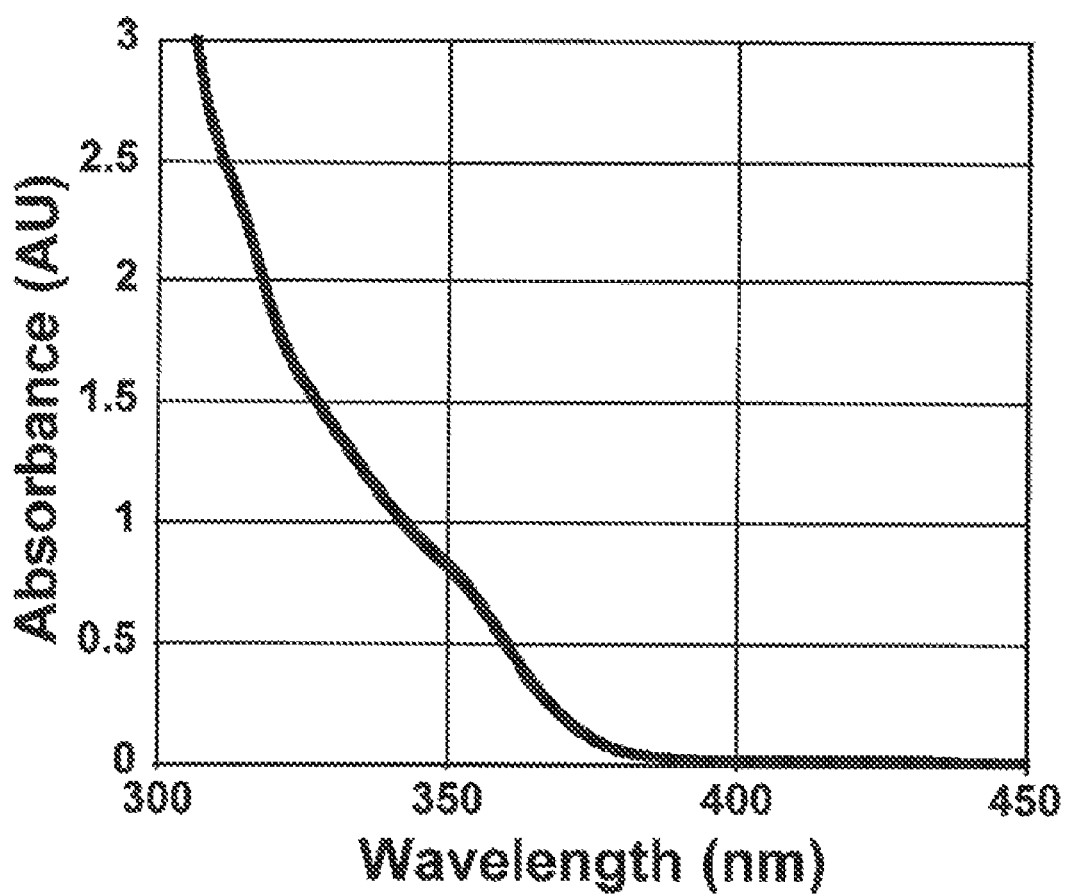
FIG. 2 Optical absorption spectra of suspended tungsten nanoparticles made using the method of Example 1.

We have developed an improved synthesis technique for producing suspended tungsten nanoparticles that are stabilized by coordinating solvents, without having to use surfactants or other stabilizing ligands. The method can be used at room temperature, is scalable, and the product concentrated by standard means. Since no additives or stabilizing surfactants are required, this method is particularly well suited for producing tungsten nanoparticles for dispersion in polymers. If complete dispersion is achieved due to the size of the nanoparticles, then the optical properties of the polymer may be largely maintained.

The metal atom in tungsten carbonyls is already in the zero oxidation state (fully reduced) and is therefore capable of forming bulk metal-metal chemical bonds if the carbonyl groups were removed. Carbonyl groups are removed by use of a reducing agent that acts on the carbonyl group, rather than the metal; thereby releasing it. Removal of the carbonyl groups in a coordinating solvent can yield nanometer-size metal particles stabilized only by the coordinating solvent. Particles formed using this method can be in the range of 1-20 nanometers. Coordinating solvents that contain oxygen as ether groups, such as tetrahydrofuran, are particularly well suited to stabilize carbonyl forming metals. The term "coordinating solvents" is defined as being "a solvent that has electrons capable of forming chemical bonds."

The coordinating solvent can comprise solvents that contain oxygen as ether groups. Alternatively, the coordinating solvent can comprise tetrahydrofuran. Alternatively, the coordinating solvent can comprise a sufficient amount of tetrahydrofuran to stabilize and suspend the formed tungsten nanoparticles. Alternatively, the molar concentration of tetrahydrofuran can be greater than or equal to 4 times the molar concentration of tungsten. Alternatively, the molar concentration of tetrahydrofuran can be greater than or equal to 6 times the molar concentration of tungsten. Alternatively, the molar concentration of tetrahydrofuran can be equal to 6 times the molar concentration of tungsten.

The size distribution of the particles formed using these methods can also be highly monodisperse. We define "highly monodisperse" as being "a set of particles having a Mean Diameter, and a full-width, half-maximum width of the size distribution being less than or equal to +/−10% of the Mean Diameter." For example, if the mean particle size is 5 nanometers, then a highly monodisperse size distribution would have a full-width, half-maximum width that is less than or equal to +/−0.5 nanometers.

These syntheses can be performed at room temperature, which is a distinct advantage over metal carbonyl thermal decomposition synthetic methods. The improved synthesis method can also be applied to tungsten halide salts of varied oxidation states, provided sufficient reducing agent is added to fully reduce the metal to its zero valence state. The general size range of tungsten particles synthesized using this method is from 5 to 20 nm.

The general method of synthesizing a suspension of tungsten nanoscale particles, according to the present invention, comprises mixing the following reagents (dispersed in suitable organic solvents) to the listed final concentrations, in an oxygen and moisture free environment, at room temperature, preferably with stirring:
  0.0001-0.1 M tungsten precursor;
  0.0001-0.1M reducing agent; and
  a sufficient molar concentration of a coordinating solvent.

The tungsten precursor can be tungsten hexacarbonyl, or a tungsten halide (such as tungsten hexachloride), as long as sufficient amount of reducing agent is added to fully reduce the tungsten in the halides to zero valence.

The reducing agent can be lithium borohydride, lithium aluminum hydride, or any other suitable reducing agent, as is well-known in the art.

A preferable solvent is pure tetrahydrofuran (THF). As a rule-of-thumb, the molar concentration of the solvent is considered sufficient when it is greater than the molar concentration of carbonyl (when the tungsten precursor is tungsten hexacarbonyl). While other solvents and solvent mixtures may be used (such as methanol or toluene), not all enable suspended tungsten nanoparticle formation. We define "suspended tungsten nanoparticle formation" as meaning that more than 50% of the tungsten precursor (e.g., tungsten hexacarbonyl) is converted into product (e.g., 1-20 nm size tungsten particles). The term "suspended" is related to the range of particle size (1-20 nm), because, in general, particles greater than the maximum size of 20 nm will settle out/precipitate in the solution. Hence, particles smaller than 20 nm remain suspended in solution, and are non-precipitating and non-aggregating.

The post-synthesis solution can be concentrated by solvent removal using standard methods (e.g., evaporative concentration). No added stabilizing agents, ligands, or surfactants are required.

General Method

A stock solution of tungsten hexacarbonyl (THC, $W(CO)_6$) in a coordinating organic solvent, such as methanol or tetrahydrofuran (THF), is prepared. This solution is either reacted neat; diluted to lower concentration with the same solvent; or can be diluted to lower concentration in a non-polar solvent, such as toluene. THC concentrations for reaction are typically 0.1-0.001 molar. To this mixture, a sufficient amount of a reducing agent, such as lithium borohydride ($LiBH_4$) or lithium aluminum hydride ($LiAlH_4$), is added from a concentrated stock solution in THF, to a final molar concentration of 1 to 10 times the molar amount of THC. All work is performed in an air and moisture free inert atmosphere; and addition of the reducing agent solution is preferably done rapidly with vigorous stirring.

Example 1

TA4-2-3

Reactants:
  0.095 M tungsten hexacarbonyl in tetrahydrofuran; and
  0.100 M lithium borohydride in tetrahydrofuran.
Steps:
  In an inert atmosphere glovebox:
    0.25 ml of 2.0 M $LiBH_4$ was added dropwise with stirring to 4.75 ml of 0.10 M $W(CO)_6$ in THF.
    Allowed to stir for a minimum of 2 hours, and then filtered through a 0.22 micron Teflon® filter to separate out any larger reaction byproducts from the nanoparticles.
Dynamic light scattering of the post-synthesis solution indicated monodisperse tungsten particles with a diameter less than 5 nm, with a yield of 67%.

Example 2

ST17-48A

Reactants:
  0.001 M $W(CO)_6$ in 10 vol % methanol/90 vol % toluene;
  0.068 M THF; and
  0.01 M
Steps:
  In an inert atmosphere glovebox:
    0.5 milliliters (ml) of 0.01 M $W(CO)_6$ in methanol was added to 4.75 ml of toluene.
    To this solution, 50 microliters of 1.0 M $LiAlH_4$ in THF was added rapidly with stirring.
    Allowed to stir for a minimum of 2 hours, and then filtered through a 0.22 micron Teflon® filter to separate out any larger reaction byproducts from the nanoparticles.
Dynamic light scattering of the post-synthesis solution indicated monodisperse tungsten particles with a diameter less than 5 nm. Yield was not determined.

Example 3

ST17-48B

Reactants:
  0.001 M $W(CO)_6$ in 10 vol % methanol/90 vol % toluene;
  0.137 M THF; and
  0.01 M $LiBH_4$
Steps:
  In an inert atmosphere glovebox:
    0.5 milliliters (ml) of 0.01 M $W(CO)_6$ in methanol was added to 4.75 ml of toluene.
    To this solution 25 microliters of 2.0 M $LiAlH_4$ in THF was added rapidly with stirring.
    Allowed to stir for a minimum of 2 hours, and then filtered through a 0.22 micron Teflon® filter to separate out any larger reaction byproducts from the nanoparticles.
Dynamic light scattering of the post-synthesis solution indicated monodisperse tungsten particles with a diameter less than 5 nm. Yield was not determined.

Experiments were performed where 100% methanol was used, in place of tetrahydrofuran. However, the yield of suspended tungsten nanoparticles was very low.

Experiments were also performed using methonal/toluene mixtures, in place of tetrahydrofuran. However, the yield of suspended tungsten nanoparticles was also very low.

Unexpectedly, when 100% tetrahydrofuran was used, a very high yield (greater than 50% yield) of suspended tungsten nanoparticles was produced.

Surprisingly, the specific amount of 100% tetrahydrofuran that was used (a the molar concentration of tetrahydrofuran equal to 6 times the molar concentration of tungsten) results in a situation where the 18 electron rule is fully satisfied. It is possible that this chemical phenomena may have contributed to the unpredictably high yield that was produced with this formulation.

The particular examples discussed above are cited to illustrate particular embodiments of the invention. Other applications and embodiments of the apparatus and method of the present invention will become evident to those skilled in the art. It is to be understood that the invention is not limited in its application to the details of construction, materials used, and the arrangements of components set forth in the following description or illustrated in the drawings.

The scope of the invention is defined by the claims appended hereto.

The invention claimed is:

1. A method of synthesizing a suspension of nanoscale particles of tungsten, comprising mixing the following reagents, dispersed in one or more organic coordinating solvents, to the listed final concentrations:
    0.0001-0.1 M of a tungsten precursor selected from the group consisting of tungsten hexacarbonyl and tungsten halide;
    0.0001-0.1 M of a reducing agent selected from the group consisting of lithium borohydride and lithium aluminum hydride; and
    a coordinating solvent in an amount such that said coordinating solvent is the only stabilizer of said suspension of nanoscale particles.

2. The method of claim 1, wherein the reducing agent is initially dispersed in tetrahydrofuran before being mixed with the tungsten precursor.

3. The method of claim 1, wherein the one or more organic coordinating solvents is selected from the group consisting of tetrahydrofuran, toluene, and methanol.

4. The method of claim 1, comprising, in the order presented:
    a) providing a starting solution of the tungsten precursor in a pure solvent or solvent mixture;
    b) adding the reducing agent with stirring;
    c) letting the solution stand for at least two hours; and
    d) filtering the solution of step c) to separate out larger reaction byproducts from the suspended nanoscale tungsten particles.

5. The method claim 1, wherein the method is performed at room temperature in an oxygen and moisture free environment; and the mixing is performed rapidly with stirring.

6. The method of claim 1, wherein the molar concentration of a tetrahydrofuran is greater than or equal to the molar concentration of carbonyl, when the tungsten precursor is tungsten hexacarbonyl.

7. The method of claim 1, wherein the coordinating solvent contains oxygen as ether groups.

8. The method of claim 7, wherein the coordinating solvent mixture comprises tetrahydrofuran in toluene.

9. The method of claim 8, wherein the coordinating solvent comprises a sufficient molar concentration of tetrahydrofuran to prevent precipitation or crystallization of the reducing agent.

10. The method of claim 8, wherein the molar concentration of tetrahydrofuran is greater than or equal to 4 times the molar concentration of tungsten.

11. The method of claim 10, wherein the molar concentration of tetrahydrofuran is greater than or equal to 6 times the molar concentration of tungsten.

12. The method of claim 11, wherein the molar concentration of tetrahydrofuran is equal to 6 times the molar concentration of tungsten.

13. The method of claim 1, wherein a yield of formed tungsten particles produced by the method of claim 1, is greater than or equal to 50% yield of the tungsten precursor.

14. A method of synthesizing a suspension of nanoscale particles of tungsten, comprising mixing the following reagents to the listed final concentrations:
    0.095 M tungsten hexacarbonyl in tetrahydrofuran; and
    0.100 M lithium borohydride in tetrahydrofuran.

15. The method of claim 14, comprising mixing the reagents dropwise with stirring in the following proportions: 0.25 ml of 2.0 M $LiBH_4$ to 4.75 ml of 0.10 M $W(CO)_6$ in THF.

16. A method of synthesizing a suspension of nanoscale particles of tungsten, comprising mixing the following reagents to the listed final concentrations:
    0.001 M $W(CO)_6$ in 10 vol % methanol/90 vol % toluene;
    0.068 M tetrahydrofuran; and
    0.01 M $LiAlH_4$.

17. The method of claim 16, comprising mixing the reagents in the following proportions: 0.5 milliliters (ml) of 0.01 M $W(CO)_6$ in methanol to 4.75 ml of toluene.

18. A method of synthesizing a suspension of nanoscale particles of tungsten, comprising mixing the following reagents to the listed final concentrations:
    0.001 M $W(CO)_6$ in 10 vol % methanol/90 vol % toluene;
    0.137 M tetrahydrofuran; and
    0.01 M $LiBH_4$.

19. The method of claim 18, comprising mixing the reagents in the following proportions: 0.5 milliliters (ml) of 0.01 M $W(CO)_6$ in methanol to 4.75 ml of toluene; and further comprising the step of adding, in the following proportions: 25 microliters of 2.0 M $LiAlH_4$ in THF to the previous mixture, and rapidly stirring.

20. A method of synthesizing a suspension of nanoscale particles of tungsten, comprising mixing the following reagents, dispersed in one or more organic coordinating solvents, to the listed final concentrations:
    0.0001-0.1 M of a tungsten precursor selected from the group consisting of tungsten hexacarbonyl and tungsten halide;
    0.0001-0.1 M of a reducing agent selected from the group consisting of lithium borohydride and lithium aluminum hydride; and
    a coordinating solvent, wherein the synthesizing is carried out in this order:
        a) providing a starting solution of the tungsten precursor in a pure solvent or solvent mixture;
        b) adding the reducing agent with stirring;
        c) letting the solution stand for at least two hours; and
        d) filtering the solution of step c) to separate out larger reaction byproducts from the suspended nanoscale tungsten particles.

* * * * *